United States Patent [19]

Taylor et al.

[11] 4,379,105

[45] Apr. 5, 1983

[54] PROCESS FOR THE PRODUCTION OF ELASTIC SHAPED ARTICLES

[75] Inventors: Ronald P. Taylor, Coraopolis; Barry A. Phillips, Slovan, both of Pa.

[73] Assignee: Mobay Chemical Corporation, Pittsburgh, Pa.

[21] Appl. No.: 288,222

[22] Filed: Jul. 29, 1981

Related U.S. Application Data

[63] Continuation-in-part of Ser. No. 170,426, Jul. 21, 1980, abandoned.

[51] Int. Cl.$^3$ .............................................. B29D 27/00
[52] U.S. Cl. ..................................... 264/45.5; 264/53; 264/54; 264/DIG. 83; 521/914
[58] Field of Search .................... 264/53, 54, DIG. 83, 264/45.5; 521/914

[56] References Cited

U.S. PATENT DOCUMENTS

| | | | |
|---|---|---|---|
| 3,336,242 | 8/1967 | Hampson et al. | 521/914 X |
| 3,428,610 | 2/1969 | Klebert | 260/75 |
| 3,706,515 | 12/1972 | Keuerleber et al. | 424/4 |
| 3,709,640 | 1/1973 | Boden et al. | 425/4 R |
| 3,857,550 | 12/1974 | Knipp et al. | 259/4 |
| 3,887,505 | 6/1975 | Demou et al. | 521/914 X |
| 3,908,966 | 9/1975 | Boden et al. | 366/179 |
| 3,926,219 | 12/1975 | Ersfeld et al. | 137/625.49 |
| 3,991,147 | 11/1976 | Knipp et al. | 264/51 |
| 4,102,833 | 7/1978 | Salisbury | 264/53 X |
| 4,126,742 | 11/1978 | Carleton et al. | 264/DIG. 83 |
| 4,190,711 | 2/1980 | Zdrahala et al. | 521/914 X |
| 4,190,712 | 2/1980 | Flanagan | 264/45.5 X |
| 4,218,543 | 8/1980 | Weber et al. | 264/45.5 X |
| 4,243,260 | 1/1981 | McDaniel et al. | 264/DIG. 83 |
| 4,259,452 | 3/1981 | Yukuta et al. | 521/914 X |
| 4,298,701 | 11/1981 | Meyborg et al. | 521/51 |
| 4,302,272 | 11/1981 | Phillips et al. | 521/914 X |
| 4,323,658 | 4/1982 | Speranza et al. | 521/914 X |

FOREIGN PATENT DOCUMENTS

| | | |
|---|---|---|
| 26915 | 10/1980 | European Pat. Off. |
| 2211914 | 3/1972 | Fed. Rep. of Germany |
| 969114 | 9/1964 | United Kingdom |
| 1089140 | 12/1964 | United Kingdom |
| 1206746 | 9/1970 | United Kingdom |
| 1408943 | 11/1972 | United Kingdom |
| 1493120 | 12/1974 | United Kingdom |
| 1382741 | 2/1975 | United Kingdom |
| 1534258 | 11/1978 | United Kingdom |

OTHER PUBLICATIONS

Prepelka/Wharton: "Reaction Injection Molding in the Automotive Industry", Journal of Cell. Plastics, vol. II, No. 2, 1975.
Knipp: "Plastics for Automobile Safety Bumpers", Journal of Cell. Plastics, No. 2, 1973.

*Primary Examiner*—Philip E. Anderson
*Attorney, Agent, or Firm*—Gene Harsh; Joseph C. Gil; Richard A. Elder

[57] ABSTRACT

This invention relates to a process for the production of optionally cellular, elastic, shaped articles having an impervious surface layer of polyurethane-polyurea elastomers by reacting a reaction mixture of organic polyisocyanate, ethylene oxide-tipped polyoxyalkylene polyols, propylene oxide-tipped polyoxyalkylene polyols, catalysts, amine chain extenders and optionally surfactants and blowing agents by the reaction injection molding (RIM) technique.

12 Claims, No Drawings

PROCESS FOR THE PRODUCTION OF ELASTIC SHAPED ARTICLES

This application is a continuation-in-part of U.S. Ser. No. 170,426, filed July 21, 1980, now abandoned.

FIELD OF THE INVENTION

This invention relates to improved polyurethane elastomers having an integral skin produced by a reaction injection molding (i.e. RIM) process.

BACKGROUND OF THE INVENTION

The production of molded articles having an integral skin by the isocyanate-polyaddition process is known. It is carried out, for example, by introducing a reactive and, optionally, foamable mixture based on compounds containing several reactive hydrogen atoms and polyisocyanates into a mold (cf. for example British Pat. No. 969,114). The compounds containing reactive hydrogen atoms used in the above reference are preferably polyethers and polyesters containing hydroxyl groups. The polyisocyanates used are, for example, 2,4- and 2,6-tolylene diisocyanate and isomer mixtures thereof. Also suitable are the polyphenyl-polymethylene-polyisocyanates obtained by condensing aniline with formaldehyde, followed by phosgenation. Water and/or fluorochlorinated hydrocarbons, for example, may be used as blowing agents. Catalysts known in the art for the production of polyurethanes are also generally used.

By suitably selecting the starting components, it is possible, by this process, to produce elastic products, rigid products and also variants falling between these two extremes.

As explained in British Pat. No. 1,534,258, it is possible to use systems containing diamines as chain extending agents. Generally, however, a one-shot process is not feasible where diamine chain extenders are used. It is necessary first to prepare a "prepolymer" containing NCO groups. This "prepolymer" is then reacted with the diamine in a second stage to form the high molecular weight elastomer (U.S. Pat. No. 3,428,610).

The production of heavily stressed moldings generally requires the use of starting materials having a slightly branched structure which, after processing, give materials having a property spectrum resembling that of elastomers. Such moldings have been commercially produced for some time (for example, as soles in the shoe industry). Large moldings of this type are used in the automotive industry.

The starting materials are processed into automotive body components primarily by the so-called "reaction injection molding" (RIM) process. This process is a filling technique in which the highly active, liquid starting components are rapidly injected into the mold through high output, high pressure metering units after mixing in so-called "static impingement" mixing heads.

A detailed description of the reaction injection molding (RIM) process may be found, for example, in the following publications: Piechota/Rohr: "Integralschaumstoffe (Integral Foams)", Carl-Hanser-Verlag, Munich/Vienna 1975; Prepelka/Wharton: "Reaction Injection Molding in the Automotive Industry", Journal of Cell. Plastics, Volume II, No. 2, 1975; Knipp: "Plastics for Automobile Safety Bumpers", Journal of Cell. Plastics, No. 2, 1973.

It is possible by the reaction injection molding (RIM) technique to produce large moldings weighing up to 10 kg and more. These large moldings are used, for example, in the form of flexible automotive body components in the automotive industry. They are known in the automotive industry as so-called "soft face" elements, i.e., reversibly deformable front or rear parts of automobiles.

Reaction injection molding (RIM) has led to molding of parts, as described above, having a major advantage over the prior art. Namely, large quantities of two liquid, highly reactive starting products are rapidly delivered (in from about two to four seconds) and, at the same time, mixed and introduced into a mold where hardening to form the final molding takes place very quickly (from 15 sec. to 2 minutes).

Before this new technology could be adopted for practical use, the following three problems had to be solved.

First, because of the high reactivity of the two starting components (polyisocyanate and polyisocyanate-reactive compounds), the reaction mixture has to be introduced into the mold in the shortest possible time, a time which at most may be as long as the gel time. Thus, there was a need to develop high performance axial and radial piston pumps which, when built into high pressure machines, would enable throughputs of from 0.5 to 6.5 kg/second to be obtained. Such machines are described, for example, in German Offenlegungsschriften 1,778,060 and 2,146,054 (British 1,382,741).

Secondly, the exact metering of the two components in a preset ratio, depending on the particular formulation, throughout the entire duration of the "shooting-in" phase is necessary. Additionally, thorough admixture thereof from the first to the last drop is essential to obtaining a fault-free molding. Satisfactory admixture is made very difficult due to the high flow velocities of the two components and the extremely short residence time in the mixing chamber of the mixing head. This problem was solved by using so-called "static impingement" mixing heads operating on the "countercurrent injection principle" (cf. German Auslegeschrift 1,948,999 [U.S. Pat. No. 3,709,640] and also German Offenlegungsschriften 2,007,935 [U.S. Pat. No. 3,706,515]; 2,219,389 [U.S. Pat. No. 3,857,550]; and 2,364,501 [U.S. Pat. No. 3,926,219]).

Thirdly, when the reaction mixture enters the closed mold, the air contained therein is almost instantaneously displaced. In order to prevent undesirable inclusions of air and, therefore, faults in the end product, the liquid flowing in has to push the air along in front of it in the form of a "flow front" and force it out at predetermined slot-like vents. Thus, in order to completely prevent turbulence during filling, the material has to enter the mold over a considerable width in the form of a laminar flow along the mold wall. This problem has been overcome through the development of a certain gating technique using so-called "film gates" of the type described in German Offenlegungsschriften 2,348,658 (U.S. Pat. No. 3,991,147) and 2,348,608 (U.S. Pat. No. 3,908,966).

German Offenlegungsschrift 2,622,951 (British Pat. No. 1,534,258) describes how even highly reactive mixtures, i.e., one-shot mixtures, of active polyisocyanates, active aromatic polyamines, relatively high molecular weight polyhydroxyl compounds containing primary hydroxyl groups and strong catalysts, having gel times of less than one second, may be processed by this method. With such systems, the transition from the liquid to the solid phase is almost instantaneous, with the result that the liquid reaction mixture hardens on the walls of the mold.

It is possible by the instant process to fill voluminous and, at the same time, thin-walled (wall thickness <3 mm), complicated mold cavities. Still-liquid material which continues to enter the mold under the filling pressure of the machine until the filling process is over would appear to force itself through between the peripheral zones of the molding hardened on the walls of the mold. This would appear to account for the fact that it is possible to produce moldings having greater weights than would appear theoretically possible by comparison of the gel time with the filling time (for a given filling volume per second). In addition, the reduced rate of viscosity increase of the instant invention over the prior art amine extended systems allows for longer flow times than were previously possible. On completion of the shot, the reaction mixture as a whole hardens so quickly that, in the case of highly reactive batches, the mold may be opened after less than thirty seconds and the molding removed therefrom.

These new systems retain the ability to produce a molding which has a low moisture absorbing potential as the previously known amine extended systems using the reaction injection molding (RIM) technique do. This is necessary in molding automotive parts for several reasons. It allows for easier finishing of the molded part and eliminates or greatly reduces blistering, bubbling, etc. of the finish applied to these molded parts. This low moisture absorptivity is also necessary to control part warpage and swelling. These necessary parameters are provided by the instant invention which, in addition, also provide longer gel times. Still another advantage of the instant invention is the greatly reduced tendency to form sink marks in the molded parts.

Although it is also possible in principle to fill voluminous mold cavities using the system according to German Offenlegungsschrift 2,622,951 (British Pat. No. 1,534,258), these systems still do not fully satisfy practical requirements. Because of the extremely short gel and filling times, these systems are still not optimally suitable for the production of very thin moldings. For example, the mass production of reversibly deformable front and rear sections of automobiles are not practical because faults attributable to incomplete filling of the mold are often encountered. This applies in particular where the reaction injection molding machines currently available are used. Although it would be possible to compensate for the above-mentioned disadvantages of these amine extended systems by using specialized reaction injection molding machines having a considerably increased output, this would require considerable additional capital investment in machinery. In addition, this would not alleviate the problems of large density gradients and/or sink marks common in the currently known reaction injection molding (RIM) amine extended systems.

An object of the instant invention is to improve the systems according to German Offenlegungsschrift 2,622,951 (British Pat. No. 1,534,258) in such a way that it is possible and practical to mass produce large volume, thin-walled moldings weighing up to 10 kg using available reaction injection molding machines. More particularly, this object is realized in the present invention by increasing the gel time and lowering the rate of viscosity increase of the amine extended systems referred to above without, at the same time, significantly affecting the short in-mold time required. The further objects of keeping moisture absorption low and reducing the tendency to form sink marks is realized in the instant invention through the particular polyol blends used. Another object of the instant invention is to improve the physical properties of the molded product (i.e. green strength, low temperature flexibility).

The achievement of the objects according to the present invention is surprising because, initially, it had been expected that the gel time would largely be determined by the more reactive amine component and not by the nature of the hydroxyl groups of the polyether. Particularly, it had not been expected that blends of two types of polyols would be superior to either type alone and that only those blends which contained a certain amount of polyoxyethylene (EO) groups would give an acceptable combination of properties.

The systems according to German Offenlegungsschrift 2,622,951 which, by virtue of the mechanical properties thereof, are ideally suitable for the production of large volume, flexible automotive body components ("soft-face" elements) have, for example, a gel time of approximately two seconds and lead to moldings which may be mold-released after from $\frac{1}{2}$ to one minute. By using the polyether polyol blends of the present invention in otherwise the same formulation, it is possible to reduce the rate of viscosity increase and thereby substantially increase the flow time, without adversely affecting the green strength or water absorption characteristics of the molded part. The longer flow times of the formulations of the present invention allow for the production of larger volume moldings without the necessity for investing in higher throughput machinery.

DESCRIPTION OF THE INVENTION

The present invention relates to a process for the production of optionally cellular, elastic, shaped articles having an impervious surface layer of polyurethane-polyurea elastomers by reacting a reaction mixture comprising:

(A) an organic polyisocyanate; and (B) an ethylene oxide-tipped di- or higher functional polyoxyalkylene polyol having a hydroxyl number of from 22 to about 35 (preferably about 28) and a total ethylene oxide content of from about 12 to about 22% by weight based on the total alkylene oxide present in polyol (B); and (C) a propylene oxide tipped di- or higher functional polyoxyalkylene polyol containing oxyethylene segments in the internal block of the polyol in a quantity of from 15–60% by weight, based on the total alkylene oxide present in polyol (C), and having a hydroxyl number of from about 22 to about 35 (preferably of about 25);

(D) a catalyst;

(E) an aromatic amine chain extender, said amine chain extender characterized as being miscible with components (B) and (C), in any proportion, (as used herein, the term "miscible" merely means capable of being mixed and includes amines either soluble or insoluble in component (B) and (C);

(F) blowing agents, surfactants and/or flow enhancing agents;

said reaction mixture being processed as one-shot systems by the reaction injection molding (RIM) technique and said reactants being used in quantities corresponding to an isocyanate index of from 70 to 130. The polyol types (B) and (C) must be used in a weight ratio of less than or equal to 5:1 [(B)/(C)], and the composition and proportions of (B) and (C) must be chosen so that the total concentration of oxyethylene (EO) groups in the final polymer is in the range of about 7 to about 14% by weight.

Starting components (A) suitable for use in the present invention are aliphatic, cycloaliphatic, araliphatic, aromatic and heterocyclic polyisocyanates of the type described, for example, by W. Siefken in Justus Liebigs Annalen der Chemie, 562, pages 75 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers are also suitable in the instant invention. Diphenylmethane -2,4'- and/or -4,4'-diisocyanate; naphthylene-1,5-diisocyanate; triphenylmethane-4,4',4''triisocyanate; polyphenyl polymethylene polyisocyanates of the type obtained by condensing aniline with formaldehyde, followed by phosgenation, and described, for example, in British Pat. Nos. 874,430 and 848,671 may also be used in the present invention. m- and p-isocyanato-phenylsulfonyl isocyanates according to U.S. Pat. No. 3,454,606; perchlorinated aryl polyisocyanates of the type described, for example, in German Auslegeschrift 1,157,601 (U.S. Pat. No. 3,277,138) polyisocyanates containing carbodiimide groups of the type described in German Pat. No. 1,902,007 (U.S. Pat. No. 3,152,162); diisocyanates of the type described in U.S. Pat. No. 3,492,330; and polyisocyanates containing allophanate groups of the type described, for example, in British Pat. No. 993,890, in Belgian Pat. No. 761,626 and in published Dutch Patent Application 7,102,524 are still further examples of suitable compounds (A). Additionally, polyisocyanates containing isocyanurate groups of the type described, for example, in U.S. Pat. No. 3,001,973; in German Pat. Nos. 1,022,789; 1,222,067 and 1,027,394 and in German Offenlegungsschriften 1,929,034 and 2,004,408; polyisocyanates containing urethane groups of the type described, for example, in Belgian Pat. No. 752,261 or in U.S. Pat. No. 3,394,164; polyisocyanates containing acylated urea groups according to German Pat. No. 1,230,778 and polyisocyanates containing biuret groups of the type described for example, in German Pat. No. 1,101,394 (U.S. Pat. Nos. 3,124,605 and 3,201,372) and in British Pat. No. 889,050 are also suitable as component (A).

Polyisocyanates produced by telomerization reactions of the type described, for example, in U.S. Pat. No. 3,654,106; polyisocyanates containing ester groups of the type described for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385 and polyisocyanates containing polymeric fatty acid residues, according to U.S. Pat. No. 3,455,883 are still further examples of suitable components (A) in the instant invention.

Aromatic polyisocyanates which are liquid at the processing temperature are preferably used as component (A). The particularly preferred starting components (A) include derivatives of 4,4'-diisocyanato-diphenyl-methane which are liquid at room temperature, for example, liquid polyisocyanates containing urethane groups of the type obtainable in accordance with German Pat. No. 1,618,380 (U.S. Pat. No. 3,644,457). These may be produced, for example, by reacting 1 mol of 4,4'-diisocyanato-diphenylmethane with from 0.05 to 0.3 mols of low molecular weight diols or triols, preferably polypropylene glycols having a molecular weight below 700 or diisocyanates based on diphenylmethane diisocyanate containing carbodiimide and/or uretone imine groups of the type obtainable, for example, in accordance with German Pat. No. 1,092,007 (U.S. Pat. No. 3,152,162). Mixtures of these preferred polyisocyanates are also preferably used. In general, aliphatic and cycloaliphatic isocyanates are less suitable for the purposes of the instant invention.

Component (B) is a di- or higher hydroxy polyether having an average molecular weight of from 3,000 to 12,000, preferably from 3,000 to 8,000. Average molecular weight may be calculated, for example, from the hydroxyl content and the mean functionality. From 12 to 22% by weight of the total oxides of the polyether chains consist of ethylene oxide units. In addition to ethylene oxide units, the polyether chains preferably contain propylene oxide units. The content of incorporated ethylene oxide units may be determined, for example, by NMR analysis. The content of secondary hydroxyl groups after acetylation may also be determined by known methods of NMR analysis. These compounds have a hydroxyl number of from 22 to 35, preferably ca. 28.

The polyhydroxy polyethers of the instant invention are produced in known manner by alkoxylating suitable starter molecules. The ethylene oxide units are incorporated by the addition of ethylene oxide or mixtures of ethylene oxide with other epoxides, preferably propylene oxide. Epoxides other than those mentioned may also be used in the production of the polyhydroxy polyethers of the present invention, provided that the polyhydroxy polyethers obtained correspond to the above definition. Suitable starter components are the conventional low molecular weight compounds containing active hydrogen atoms, such as water, ammonia, alcohols, or amines. Some suitable examples are glycerine, ethylene glycol; 1,3-propylene glycol or 1,2-propylene glycol; trimethylol propane; 4,4'-dihydroxy diphenylpropane; aniline; ethanolamine or ethylene diamine. Sucrose polyethers of the type described, for example, in German Auslegeschriften 1,176,358 and 1,064,938 may also be used in the present invention. The polyhydroxy polyethers and/or polyhydroxy polyether mixtures preferably have a mean OH functionality of from 2 to 4, preferably 3. In general, from about 80 to 100% of the hydroxyl groups of polyether (B) are primary hydroxyl groups.

It is also possible to use polyethers corresponding to the above definition which have been subsequently modified in known manner. These modified polyethers include polyethers modified, for example, by vinyl polymers of the type formed, for example, by the olymerization of styrene and acrylonitrile in the presence of polyethers (U.S. Pat. Nos. 3,383,351; 3,304,273; 3,523,093; 3,110,695 and German Pat. No. 1,152,536). Another suitable type of modified polyether are those polyhydroxyl compounds containing high molecular weight polyadducts or polycondensates in finely disperse or dissolved forms. Such modified polyhydroxyl compounds are obtained by carrying out polyaddition reactions (for example, reactions between polyisocyanates and aminofunctional compounds) or polycondensation reactions (for example, between formaldehyde and phenols and/or amines) directly in situ in the above-mentioned compounds containing hydroxyl groups. Such processes are described, for example, in German Auslegeschriften 1,168,075 and 1,206,142 and in German Offenlegungsschriften 2,324,134; 2,423,984; 2,550,796; 2,512,385; 2,513,815; 2,550,797; 2,550,833 and 2,550,862. However, it is also possible in accordance with U.S. Pat. No. 3,869,413 or German Offenlegungsschrift 2,550,860 to mix an aqueous polymer dispersion with a polyhydroxyl compound and subsequently to remove the water from the mixture.

Component (C) is a polyhydroxy polyether having an average molecular weight of from 3,000 to 12,000, preferably from 3,000 to 8,000. These propylene oxide tipped di- or higher functional polyether polyols contain ethylene oxide segments in the internal block of the polyol in a quantity of from 15 to 60% by weight of total oxide, preferably 17–38% and most preferably ca. 27%. Substantially all of the balance of component (C) is a polyoxyalkylene other than polyoxyethylene. These compounds have a hydroxyl number of from 22 to 35, preferably from 25 to 28 and preferably a mean OH functionality of from 2 to 4, most preferably 3. In general, close to 100% of the hydroxyl groups of polyether (C) are secondary hydroxyl groups.

The polyhydroxy polyethers, component (C), of the instant invention are produced in known manner. One of these known methods is, for example, by reacting an initiator (i.e. glycerine and/or propylene glycol) with a mixture of propylene oxide and ethylene oxide (said mixture containing from 15 to 60% ethylene oxide, by weight, based on the total oxide present in the final polyol) and subsequently reacting this product with propylene oxide to provide the "PO-tipping" on the chain ends. Another example is, for example, reacting an initiator (glycerine and/or propylene glycol) with ethylene oxide and subsequently reacting this product with propylene oxide to provide the "PO-tipping". Still another example is reacting an initiator (glycerine and/or propylene glycol) with propylene oxide and subsequently reacting this product with ethylene oxide and then subsequently reacting this product with propylene oxide to provide the "PO-tipping". Alternatively, these polyhydroxy polyethers, component (C), may be produced by, for example, reacting a low molecular weight polyol (said polyol comprising an initiator with PO already present) with ethylene oxide and subsequently reacting this product with propylene oxide to provide the "PO-tipping". Also suitable is reacting a low molecular weight polyol (said polyol comprising an initiator with EO present) with propylene oxide to provide the "PO-tipping". Another suitable method is reacting a low molecular weight polyol (said polyol comprising an initiator with either ethylene oxide or propylene oxide present) with a mixture of ethylene oxide and propylene oxide (said mixture containing from 15 to 60% ethylene oxide based on the total oxide present in the final polyol) and subsequently reacting this product with propylene oxide to provide the "PO-tipping".

Suitable initiators for preparing a polyether polyol are the conventional low molecular weight compounds containing active hydrogen atoms, such as water, ammonia, alcohols or amines. Some suitable examples are glycerine; ethylene glycol; 1,3-propylene glycol or 1,2-propylene glycol; trimethylol propane; 4,4'-dihydroxy diphenylpropane; aniline; ethanolamine or ethylene diamine. Sucrose polyethers of the type described, for example, in German Auslegeschriften 1,176,358 and 1,064,938 may also be used in the present invention. The polyhydroxy polyethers and/or polyhydroxy polyether mixtures preferably have a mean OH functionality of from 2 to 4, preferably 3.

It is also possible to use polyethers corresponding to the above definition which have been subsequently modified in known manner. These modified polyethers include polyethers modified, for example, by vinyl polymers of the type formed, for example, by the polymerization of styrene and acrylonitrile in the presence of polyethers (U.S. Pat. Nos. 3,383,351; 3,304,273; 3,523,093; 3,110,695 and German Patent 1,152,536). Another suitable type of modified polyether modified with polyhydroxyl compounds containing high molecular weight polyadducts or polycondensates in finely disperse or dissolved form. Such modified polyhydroxyl compounds are obtained by carrying out polyaddition reactions (for example reactions between polyisocyanates and aminofunctional compounds) or polycondensation reactions (for example, between formaldehyde and phenols and/or amines) directly in situ in the above-mentioned compounds containing hydroxyl groups. Such processes are described, for example, in German Auslegeschriften 1,168,075 and 1,260,142 and in German Offenlegungsschriften 2,324,138; 2,423,984; 2,512,385; 2,513,815; 2,500,796; 2,550,797; 2,550,833 and 2,550,862. However, it is possible in accordance with U.S. Pat. No. 3,869,413 or German Offenlegungsschrift 2,500,860 to mix an aqueous polymer dispersion with a polyhydroxyl compound and subsequently to remove the water from this mixture.

It is generally known that increasing the ethylene oxide content of elastomeric polyurethanes leads to increased water absorption, and that decreasing the ethylene oxide content leads to decreased water absorption. It is further generally known that polyether polyols having secondary hydroxyl groups (i.e., PO-tipped polyols) are less reactive with isocyanates than are polyether polyols having primary hydroxyl groups (i.e., EO-tipped polyols). Surprisingly, it was found that blends of conventional EO-tipped polyols with PO-tipped polyols containing 15 to 60% by weight ethylene oxide content in their internal block provided a superior combination of green strength, flowability and water absorption characteristics, relative to either polyol alone. It was further surprisingly found that blends which produced final polyurethane polymers containing from about 7 to about 14% by weight of EO-groups were superior to blends of other compositions. The ethylene oxide contents of components (B) and (C) and the ratio of component (B) to component (C) can vary over a wide range to produce the desired range of ethylene oxide content and therefore the desired combination of properties. For a significant improvement in flowability, this ratio must be maintained at less than or equal to about 5:1 but may be as low as 1:5 or lower. Preferably this weight ratio of component (B) to component (C) is from 4:1 to 1:4 and most preferably 2:1 to 1:2. Using all component (B) and no component (C) is known. The key to the instant invention is in the use of some component (C) to get significantly increased gel times while still maintaining acceptable green strength and low water absorption characteristics of the final polymer.

The most desirable combination of green strength, water absorption, other physical properties and flow time was obtained by optimizing the weight ratio of the two types of polyols and the ethylene oxide content of each. Among analogous formulations with similar total ethylene oxide contents and different ratios of PO-tipped and EO-tipped polyols, the formulation with the highest concentration of the PO-tipped polyol has been found to produce the longest flow time. The ability to optimize all of the physical properties of interest and to simultaneously significantly increase flow times was therefore surprising in light of the amine extended systems of the prior art.

In addition to the required polyol compositions and ratios, it is also necessary to use suitable catalysts (component (D)) for the reaction between the isocyanate groups and the hydroxyl groups. Without these catalysts, it is not possible to obtain moldings having technically interesting mechanical properties with short in-mold times. Suitable catalysts are, for example, the catalysts mentioned in German Offenlegungsschrift 2,622,951. It is preferred to use known organo-metallic catalysts, and particularly organo-tin catalysts. The concentration of catalyst required for adequate green strength has been found to depend on the composition, including ethylene oxide contents of the individual polyols, ratios of the two polyols, chain-extender concentration and isocyanate type. Several examples of the instant invention apparently exhibited poor green strength because of an insufficiency of catalyst.

The preferred catalysts include organo-tin compounds including, for example, dibutyl tin dilaurate, dibutyl tin (IV)-dilauryl mercaptide, dioctyl tin (IV)-dilauryl mercaptide, tin(II)-dilauryl mercaptide and dibutyl tin diacetyl acetonate. With the last-mentioned compounds, it is possible to further lengthen the pouring time. In this connection, it is particularly surprising and, so far as those skilled in the art are concerned, virtually inexplicable that longer pouring times are obtained by increasing the concentration of catalyst. The particularly preferred organo-tin compounds are dibutyl tin dilaurate and dibutyl tin dilauryl mercaptide.

In addition to the organo-metallic catalysts, it is also possible to use tertiary amine catalysts. Examples of suitable tertiary amines include N-methyl morpholine, N,N,N',N'-tetra-methylethylene diamine, 1,4-diazabicyclo-(2.2.2)-octane, N,N-dimethylbenzylamine, 2-methyl-1,4-diazabicyclo-(2.2.2)-octane, 2-methylimidazole and 2,3-dimethyl-tetrahydropyrimidine. The preferred tertiary amines are 2,3-dimethyl tetrahydropyrimidine and/or 1,4-diazabicyclo-(2.2.2)-octane.

Other examples of catalysts to be used with the instant invention, as well as details about the mode of operation of the catalysts are described in "Kunststoff-Handbuch", Volume VII, edited by Vieweg and Hochtlen, Carl-Hanser-Verlag, Munich, 1966, for example on pages 96 to 102.

The catalysts are generally used in a quantity of from about 0.001 to 10% by weight, preferably from 0.05 to 2% by weight, based on the total quantity of components (B), (C), (D), (E) and (F).

The chain extending agent (E) is used in quantities of from 5 to 50% by weight and, with particular preference, from 12 to 30% by weight, based on the total amount of components (B), (C), (D), (E) and (F).

Aromatic amines, which may be used either on their own or in admixture as the chain extending agent (E), are, for example, 2,4- and 2,6-diaminotoluene, 2,4'- and/or 4,4'-diamino-diphenylmethane, 1,2- and 1,4-phenylene diamine, naphthylene-1,5-diamine and triphenyl methane-4,4',4"-triamine. The difunctional and polyfunctional aromatic amine compounds may also exclusively or partly contain secondary amino groups, such as 4,4'-di-(methylamino)-diphenylmethane, or 1-methyl-2-methyl-amino-4-aminobenzene. Liquid mixtures of polyphenyl polymethlene-polyamines, of the type obtained by condensing aniline with formaldehyde, are also suitable.

Liquid or dissolved aromatic diamines which contain at least one linear or branched alkyl substituent in the o-position, to the first amino group and two linear or branched alkyl substituents containing from 1 to 3 carbon atoms in the o-position to the second amino group, have proved to be particularly suitable for the instant process. Such aromatic diamines are, for example, 1,3-diethyl-2,4-diaminobenzene; 2,4-diaminomesitylene; 1-methyl-3,5-diethyl-2,4-diaminobenzene; 1-methyl-3,5-diethyl-2,6-diaminobenzene; 1,3,5-triethyl-2,4-diaminobenzene; 3,5,3',5'-tetraethyl-4,4'-diaminodiphenylmethane or 3,5,3',5'-tetraisopropyl-4,4'-diaminodiphenylmethane. Preferred is a mixture of 1-methyl-3,5-diethyl-2,4-diaminobenzene and 1-methyl-3,5-diethyl-2,6-diaminobenzene in a ratio range between 50:50 to 85:15, and particularly preferred in a ratio range of between 65:35 and 80:20.

The above-mentioned aromatic diamines may, of course, also be used in admixture with one another and also in combination with other active aromatic diamines.

Compact moldings may be produced without using blowing agents. It is possible, however, to use blowing agents. Thus, water and/or readily volatile organic compounds may be used as the blowing agents (F). Examples of suitable organic blowing agents are acetone, ethyl acetate, methanol, ethanol, halogen-substituted alkanes, such as methylene chloride, chloroform, ethylidene chloride, vinylidene chloride, monofluorotrichloromethane, chlorodifluoromethane, dichlorodifluoromethane, also butane, hexane, heptane or diethyl ether.

A blowing effect may also be obtained by adding compounds which decompose at temperatures above room temperature with the evolution of gases such as, for example, nitrogen. An example of this kind of compound is an azo compound, such as azoisobutyronitrile. Further examples of blowing agents and information on the use of blowing agents may be found in Kunststoff-Handbuch, Volume VII, by Vieweg and Hochtlen, Carl-Hanser-Verlag, Munich, 1966, for example on pages 108 and 109, 453 to 455 and 507 to 510.

The blowing effect produced by these conventional blowing agents is slight compared to non-amine extended systems. However, the use of blowing agent does enhance the flow characteristics of the instantly claimed systems as well as generally producing a slight blowing effect.

It is also possible to use surface-active additives (emulsifiers and foam stabilizers). Examples of suitable emulsifiers are the sodium salts of castor oil sulfonates or even of fatty acids or salts of fatty acids with amines, such as diethyl amine oleate or diethanolamine stearate.

Alkali metal or ammonium salts of sulfonic acid, such as dodecyl benzene sulfonic acid or dinaphthyl methane disulfonic acid or even of fatty acids, such as ricinoleic acid, or of polymeric fatty acids may also be used as surface-active additives.

Suitable foam stabilizers are, above all, water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565.

It is also possible to use known cell regulators such as paraffins or fatty alcohols, and known flame-proofing agents, for example tris-chloroethyl phosphate or ammonium phosphate and ammonium polyphosphate. It is also possible to use stabilizers against the effects of aging and weathering, plasticizers and fungistatic and bacteriostatic substances, as well as fillers such as barium sulfate, kieselguhr, carbon black or whiting.

Further examples of surface-active additives, foam stabilizers, cell regulators, stabilizers, flame-proofing agents, plasticizers, dyes and fillers, fungistatic and bacteriostatic substances and information on the way in which these additives are used and how they work may be found in Kunststoff-Handbuch, Volume VI, by Vieweg and Hochtlen, Carl-Hanser-Verlag, Munich 1966, for example on pages 103 to 113.

In the instant process, the quantity in which the polyisocyanate (component (A)) is used is preferably measured in such a way that the foamable mixture has an isocyanate index of from 70 to 130, more particularly from 90 to 110. The isocyanate index is the quotient of the number of isocyanate groups and the number of isocyanate-reactive groups multiplied by 100.

The instant process is carried out by the reaction injection molding (RIM) technique. The quantity in which the optionally foamable reaction mixture is introduced into the mold is measured to produce a molding having a density of from 0.8 to 1.2 g/cc, preferably from 0.9 to 1.1 g/cc.

The preferred starting temperatures of the mixture introduced into the mold is from 10° to 60° C., most preferably from 25° to 50° C. The temperature of the mold is from 40° to 100° C., preferably from 50° to 70° C.

Known mold-release agents of the type described, for example, in German Offenlegungsschriften 1,953,637 and 2,121,670, may also be used in the instant process.

The moldings obtainable by the instant process are particularly suitable for the production of flexible automobile fenders and automotive body components. However, it is also possible, by varying the starting compounds (A) to (E), particularly by using a relatively small quantity of diamine (E), to obtain, for example, flexible polyurethane shoe soles having favorable abrasion behavior and excellent mechanical strength.

For polyurethane elastomers made by the RIM process, the end-use application will dictate the physical property requirements. Formulation variables, such as chain extender type and concentration and isocyanate type and reaction index, will be adjusted to produce the desired physical properties. For example, for automotive applications such as fascia or bumper covers, a room temperature flexural modulus of approximately 25,000 psi is desired. A given standard type (RIM) formulation containing a concentration of about 18% aromatic diamine chain extender will provide that flexural modulus. For applications requiring more dimensional stability such as air dams or spoilers, a room temperature flexural modulus of 50,000 psi is desired. A standard type (RIM) formulation with a concentration of about 23% aromatic diamine chain extender will produce the flexural modulus. This trend of flexural modulus with chain extender concentration is demonstrated in Table I.

TABLE I

| Aromatic diamine chain extender concentration (80 pbw 1-methyl-3, 5-diethyl-2,4-phenylene diamine; 20 pbw 1-methyl-3,5-diethyl-2, 6-phenylene diamine) | Room Temperature flexural modulus, psi (ASTM D-790) |
|---|---|
| 13 | 11,500 |
| 18 | 25,000 |
| 23 | 50,000 |

(All other formulation components remain constant).

Besides the concentration of chain extender and minor amounts of catalysts, blowing agents or surfactants, the remainder of the polyol formulation will be composed in the present invention of mixtures of the EO-tipped and PO-tipped polyols. To attain the best flowability, larger amounts of the propylene oxide tipped polyols are required, relative to the ethylene-oxide-tipped polyol concentration. Among the propylene oxide-tipped polyols, those with higher concentrations of polyoxyethylene in the internal segment have been found to give better "green strength" or resistance to cracking or tearing of the molded part at demold. However, high contents of polyoxyethylene in polyurethane polymers are known to encourage absorption of water into the polymer. Therefore, it is important to control the proportions of ethylene oxide-tipped and propylene oxide-tipped polyols to get the best balance of physical properties, flowability and water absorption.

In the present system, water absorption of the final polymer has been found to correlate very well to the total oxyethylene content of the final polymer, whether from the tip of the EO-tipped polyol or from the internal block of the PO-tipped polyol. Resistance to water absorption is an important property for polyurethane elastomers for automotive applications since molded parts will distort if excess water is absorbed. Water absorption of about 5% by weight is generally accepted as an approximate upper limit for acceptable performance.

Water absorption in the formulations of the invention has been found to generally fit the following equation, based on the total percent by weight of oxyethylene (EO) in the final polymer:

$$\% \text{ water uptake} = 3.63 - 0.52(\text{EO}) + 0.046(\text{EO})^2.$$

The multiple correlation coefficient of the analysis is 0.94, which means that 94% of the variability of all the experimental determinations is explained solely by the EO content. Only the remaining 6% is dependent on other variables such as the polyol OH numbers, EO contents and ratios of the individual polyols, the catalyst, the chain extender concentration, the type of isocyanate used, and the experimental error of the water determination itself. This equation can therefore be used to calculate, quite accurately, new formulations which will give acceptable product characteristics.

For water uptake to remain lower than about 5%, the total weight % of EO in the polymer must remain below about 14%. The total EO content is the sum of the EO groups in both polyols. There are, of course, many combinations of ratio and composition of EO-tipped and PO-tipped polyols that will maintain the total EO content at less than about 14%. Once an isocyanate type and chain extender concentration have been chosen for the desired flexural modulus (see Table I), specific polyols noted and the specific catalyst concentration.

Table II shows the results of analogous calculations at various chain extender concentrations, using the same two polyols, the same catalyst concentrations and the same isocyanate.

TABLE II

| Aromatic Diamine Chain Extender (a) | | Total Polyols (EO-Tipped + PO-Tipped) (b) (pbw) | Isocyanate Consumption (c) (%) | Max Amt. of EO in Polyols (pbw) | Max. Amt. of PO-tipped polyol In Blend (d) Blend (e) (pbw) | Amt of EO-Tipped Polyol in |
|---|---|---|---|---|---|---|
| Blend | Conc (pbw) | | | | | |
| A | 12 | 87.9 | 32.9 | 18.6 | 51.2 | 36.7 |
| B | 15 | 84.9 | 38.8 | 19.4 | 60.0 | 24.9 |
| C | 18 | 81.9 | 44.8 | 20.3 | 68.7 | 13.2 |
| D | 20 | 79.9 | 48.7 | 20.8 | 74.4 | 5.5 |
| E | 23 | 76.9 | 54.7 | 21.7 | 76.9 | -0- |

(a) Aromatic diamine with an equivalent weight of 89 comprising about 80 pbw of 1-methyl-3,5-diethyl-2,4-phenylenediamine and about 20 pbw of 1-methyl-3,5-diethyl-2,6-phenylene diamine.
(b) 22.8% NCO, MDI quasi-prepolymer (equivalent weight 184.2).
(c) to give about 14% EO in final polymer.
(d) PO-tipped, polyether polyol having 27% EO, functionality of 3 and OH number 28.
(e) EO-tipped polyether polyol having 13% EO, functionality of 3 and a hydroxyl (OH) number of 28.

the ratio of the two polyols can be readily calculated.

The following is a sample calculation for Example A in Table II. The other blends are calculated in the same manner.

First, the following facts are noted:
(a) Chain extender: equivalent weight = 89
(b) Isocyanate: %NCO = 22.8 and equivalent weight = 184.2
(c) Catalyst concentration: 0.1 part
(d) PO-tipped polyol: OH number = 28 (equivalent weight = 2004) with 27% internal EO content
(e) EO-tipped polyol: OH number = 28 (equivalent weight = 2004) with 13% EO as a tip.

It is then assumed that the total amount of the active hydrogen containing components is 100 parts. Next, a chain extender concentration is selected (in this case, 12 pbw). The polyol concentration is thus 100-12-0.1 = 87.9.

The equivalents contributed by the chain extender = $\frac{12}{89}$ = 0.1348

Polyol equivalents = $\frac{88}{2004}$ = 0.0439

Total equivalents = 0.1348 + 0.043 = 0.1787
Isocyanate consumption = 0.1787 × 184.2 = 32.9 pbw
Total Polymer weight = 100 + 32.9 = 132.9
The maximum total amount of EO in the polymer is therefore (132.9)(14%) = 18.6

To determine the ratio of PO-tipped to EO-tipped polyols, let a = amount of PO-tipped polyol, and b = amount of EO-tipped polyol. a+b must equal 87.9 (total polyol concentration). Since the PO-tipped polyol contains 27% EO and the EO-tipped polyol contains 13% EO, therefore, 0.27 a+0.13 b = 18.6 (total EO in polymer). Solving the two equations containing a and b,
 a = 51.24 and
 b = 36.67

Therefore the total amount of this PO-tipped polyol that could be used in that specific formulation is about 51.2 to give 14% total EO in the polymer, and to provide acceptable water absorption. Since flow time has been found to increase with higher concentrations of PO-tipped polyol, this combination would also represent the largest flow time formulation using the two The following Examples serve to illustrate the process of the invention without restricting it in any way. In the Examples, all quantities quoted represent parts by weight or percent by weight, unless otherwise indicated.

The following formulations were used in the Examples

Polyol A: PO-tipped poly(oxyalkylene) polyether: A glycerine initiated poly(oxyalkylene) polyether of OH number 25 containing an internal mixed block of 27% ethylene oxide and 48% propylene oxide with a 25% propylene oxide tip. This polyether was produced by polymerizing a mixture of PO and EO with glycerine until the reaction produced the desired internal mixed block and then adding an excess of propylene oxide and continuing the polymerization to produce the polyoxypropylene tip.

Polyol B: EO-tipped poly(oxyalkylene) polyether: A glycerine initiated poly(oxyalkylene) polyether of OH number 28, containing 82.5% propylene oxide and 17.5% ethylene oxide tip. This polyether was produced by polymerizing propylene oxide in an amount equal to 82.5% by weight of the total amount of oxides desired until the desired percentage of propylene oxide has been reached and then adding 17.5% by weight of ethylene oxide and polymerizing it onto the ends of the poly(oxypropylene) chains to produce the EO-tip.

Polyol C: EO-tipped poly(oxyalkylene) polyether: A glycerine initiated poly(oxyalkylene) polyether of OH number 28, containing 87% propylene oxide and 13% ethylene oxide tip produced in a manner similar to Polyol B.

Polyol D: PO-tipped poly(oxyalkylene) polyether: A propylene glycol-initiated poly(oxyalkylene) polyether of OH number 28, containing a mixed block of 50% ethylene oxide and 40% propylene oxide with a 10% propylene oxide tip produced in a manner similar to Polyol A.

Polyol E: PO-tipped poly(oxyalkylene) polyether: A glycerine initiated poly(oxyalkylene) polyether of OH number 26, containing a mixed block of 60% ethylene oxide and 30% propylene oxide with a 10% propylene oxide tip produced in a manner similar to Polyol A.

Polyol F: PO-tipped poly(oxyalkylene) polyether: A glycerine initiated poly(oxyalkylene) polyether of OH number 25, containing mixed block of 37.5% ethylene oxide and 37.5% propylene oxide with a 25% propylene oxide tip produced in a manner similar to Polyol A.

Polyol G: PO-tipped poly(oxyalkylene) polyether: A glycerine initiated poly(oxyalkylene) polyether of OH number 25, containing a mixed block of 17% ethylene oxide and 58% propylene oxide with a 25% propylene oxide tip produced in a manner similar to Polyol A.

Polyisocyanate H: 4,4'-diphenylmethane diisocyanate which has been liquefied by reaction in a molar ratio of about 10:1 with a mixture of 5.6 parts by weight of a 2,000 molecular weight polypropylene glycol and 1.0 part by weight of tripropylene glycol, and then reacting 1 part by weight of this product with about 1 part by weight of 4,4'-diphenylmethane diisocyanate which has been liquefied by partial carbodiimidization to produce an NCO % of from 28.7 to 29.5%, resulting in a liquid product with about 26% NCO. This material has a viscosity at 25° C., mPa.s of <100 and a specific gravity of about 1.22.

Polyisocyanate I: 4,4'-diphenylmethane diisocyanate which has been liquefied by reaction in a molar ratio of approximately 5:1 with tripropylene glycol to give a liquid product with about 23% NCO, further characterized as having a viscosity at 25° C., cps of 725±175.

All physical properties were obtained from test plaques prepared on a HK-500 RIM machine using a Krauss-Maffei mixhead. The plaque mold had dimensions of 445×760×3.5 mm and had a 25.4 mm perpendicular flange. The processing conditions used were as follows: raw material temperature=95° F.; mold temperature=150° F.; mixing pressure=2,500 psi; and mold residence time=30 seconds.

Tables III, IV and V show formulations, physical properties, green strength and water absorption data for blends included within the scope of the invention as well as comparison examples outside the scope of the instant invention.

TABLE III

| | Formulations | | | | | | | |
|---|---|---|---|---|---|---|---|---|
| | EO-tipped Polyol | | PO-tipped Polyol | | Chain** Extender | Isocyanate | | Catalyst*** | |
| Ex # | Type | pbw | Type | pbw | pbw | Type | pbw | T-12 | UL-1 |
| 1* | — | 0 | A | 76.6 | 23 | H | 50.3 | .1 | .3 |
| 2 | B | 41.1 | A | 38.3 | 20.35 | H | 46.8 | .1 | .15 |
| 3 | B | 41.1 | A | 38.3 | 20.35 | I | 53.4 | .1 | .15 |
| 4 | C | 49.1 | A | 32.8 | 18 | H | 42.6 | 0 | .1 |
| 5 | C | 49.0 | A | 32.8 | 18 | I | 48.6 | .1 | .1 |
| 6 | C | 47.8 | A | 32 | 20 | I | 52.7 | .1 | .1 |
| 7 | C | 47.8 | A | 32 | 20 | H | 46.2 | .1 | .1 |
| 8 | C | 41.6 | A | 41.6 | 16.6 | I | 44.4 | .1 | .1 |
| 9 | C | 41.25 | A | 41.25 | 17.3 | I | 46.5 | .1 | .1 |
| 10* | B | 82.2 | — | 0 | 17.7 | I | 45.7 | .1 | 0 |
| 11 | B | 60.35 | D | 20.1 | 19.3 | I | 49.0 | 0 | .25 |
| 12* | B | 19.4 | D | 58.5 | 21.7 | I | 53.9 | 0 | .4 |
| 13* | B | 39.62 | D | 39.63 | 20.4 | I | 51.3 | 0 | .35 |
| 14* | — | 0 | E | 81.2 | 18.5 | I | 49.4 | 0 | .3 |
| 15* | B | 40.85 | E | 40.85 | 18 | I | 48.6 | 0 | .3 |
| 16* | B | 40.85 | E | 40.85 | 18 | H | 41.8 | 0 | .3 |
| 17* | — | 0 | E | 81.2 | 18.5 | H | 42.5 | 0 | .3 |
| 18* | — | 0 | E | 77.7 | 22 | H | 50 | 0 | .3 |
| 19* | — | 0 | F | 76.6 | 23 | H | 50.3 | .1 | .3 |
| 20* | B | 41.1 | F | 38.3 | 20.35 | H | 45.8 | .1 | .15 |
| 21 | B | 41.1 | F | 38.3 | 20.35 | I | 53.4 | .1 | .15 |
| 22 | C | 49.1 | F | 32.8 | 18 | I | 48.1 | .1 | 0 |
| 23* | — | 0 | G | 76.6 | 23 | I | 58.5 | .1 | .3 |
| 24 | B | 41.1 | G | 38.3 | 20.35 | I | 53.4 | .1 | .15 |
| 25 | B | 41.1 | G | 38.3 | 20.35 | H | 46.8 | .1 | .15 |
| 26 | C | 32.8 | G | 49.1 | 18 | I | 48 | .1 | 0 |
| 27 | C | 49.1 | G | 32.8 | 18 | I | 48.1 | .1 | 0 |
| 28* | B | 76.9 | — | 0 | 23 | I | 58.5 | .1 | 0 |
| 29 | C | 25.5 | A | 51.1 | 23 | I | 58 | .1 | .3 |
| 30* | C | 82.2 | — | 0 | 17.7 | I | 48 | .1 | 0 |
| 31* | C | 76.9 | — | 0 | 23 | I | 58.5 | .1 | 0 |
| 32 | C | 47.9 | A | 31.95 | 20 | I | 52.8 | .15 | 0 |

*Comparison Examples
**Mixture of about 80 pbw 1-methyl-3,5-diethyl-2,4-phenylene diamine and 20 pbw 1-methyl-3,5-diethyl-2,6-phenylene diamine.
***T-12; M & T dibutyl tin dilaurate; UL-1: Witco, dibutyl tin dilauryl mercaptide.

TABLE IV

| Ex. # | Density pcf | Tensile Strength[1] psi | Elongation[1] % | Flex Modulus[2] at 72° F., psi | Heat Sag,[3] mm, (1 hour @ 250° F., 4" OH) |
|---|---|---|---|---|---|
| 1 | 62.3 | 2800 | 380 | 25920 | 5.5 |
| 2 | 62.5 | 2800 | 340 | 24000 | 4.4 |
| 3 | 61.8 | 3400 | 300 | 35600 | 2.8 |
| 4 | 63.3 | 2420 | 315 | 14690 | 4.2 |
| 5 | 62.1 | 3050 | 300 | 25260 | 4.5 |
| 6 | 61.9 | 3190 | 310 | 32070 | 4.1 |
| 7 | 62.6 | 2770 | 355 | 20470 | 5.5 |
| 8 | 63.5 | 2800 | 330 | 19100 | 7.2 |
| 9 | 61.2 | 2700 | 300 | 21200 | 5.0 |
| 10 | 65.4 | 2830 | 370 | 28000 | 11.5 |
| 11 | 64.5 | 3030 | 300 | 25300 | 6.0 |
| 12 | 63.2 | 3500 | 380 | 24400 | 4.5 |
| 13 | 63.2 | 3370 | 380 | 23900 | 3.3 |
| 14 | 65.4 | 2700 | 290 | 15700 | 3.7 |
| 15 | 64.8 | 2800 | 260 | 21900 | 4.0 |
| 16 | 65.7 | 2980 | 320 | 16000 | 4.1 |
| 17 | 64.7 | 2530 | 360 | 14000 | 4.9 |
| 18 | 62.9 | 2850 | 340 | 23200 | 3.5 |
| 19 | 62.0 | 3325 | 330 | 30200 | 3.5 |
| 20 | 62.5 | 2880 | 400 | 23500 | 6.2 |
| 21 | 62.8 | 3450 | 310 | 35200 | 8.7 |
| 22 | 62.5 | 2800 | 330 | 22140 | 3.7 |
| 23 | 62.9 | 3180 | 220 | 47020 | 3.7 |
| 24 | 62.2 | 3090 | 265 | 37570 | 4.1 |
| 25 | 63.1 | 2800 | 270 | 20780 | 4.3 |
| 26 | 60.6 | 2540 | 275 | 18730 | 5.9 |
| 27 | 62.3 | 2650 | 300 | 23510 | 6.5 |
| 28 | 65.0 | 3800 | 280 | 53000 | 5.0 |
| 29 | 62.0 | 3200 | 275 | 45000 | 5.0 |
| 30 | 61.7 | 4000 | 260 | 28100 | 3.8 |
| 31 | 61.4 | 3700 | 210 | 53600 | 1.9 |
| 32 | 62.7 | 3200 | 280 | 34200 | 2.4 |

[1]Tested per ASTM D-412
[2]Tested per ASTM D-790
[3]Tested per ASTM D-3769

TABLE V

| EX# | CALCULATED % EO in POLYMER | WATER ABSORPTION, %* | GREEN STRENGTH @ 30 Sec. DEMOLD |
|---|---|---|---|
| 1 | 13.8 | 6.17 | Poor |
| 2 | 11.9 | 3.55 | Fair |
| 3 | 11.4 | 3.12 | V. Good |
| 4 | 10.69 | 3.29 | Fair |
| 5 | 10.26 | 3.0 | Excellent |
| 6 | 9.74 | 2.83 | Excellent |
| 7 | 10.17 | 3.7 | Poor |
| 8 | 11.52 | 3.84 | Excellent |
| 9 | 11.26 | 3.68 | Good |
| 10 | 9.7 | 3.0 | Excellent |
| 11 | 13.9 | 4.4 | V. Good |
| 12 | 21.3 | 11.5 | Fair |
| 13 | 17.7 | 7.8 | Fair |
| 14 | 32.5 | 29.9 | Good |
| 15 | 21.3 | 10.5 | V. Good |
| 16 | 22.3 | 17.5 | V. Good |
| 17 | 34.1 | 47.3 | V. Good |
| 18 | 31 | 25.3 | Excellent |
| 19 | 19.2 | 16.25 | Good |
| 20 | 14.8 | 6.83 | V. Good |
| 21 | 14 | 4.11 | V. Good |

TABLE V-continued

| EX# | CALCULATED % EO in POLYMER | WATER ABSORPTION, %* | GREEN STRENGTH @ 30 Sec. DEMOLD |
|---|---|---|---|
| 22 | 12.62 | 4.66 | Fair |
| 23 | 8.2 | 2.66 | Poor |
| 24 | 8.8 | 2.66 | Fair |
| 25 | 9.19 | 2.59 | Poor |
| 26 | 8.52 | 2.69 | V. Poor |
| 27 | 8.07 | 2.58 | V. Poor |
| 28 | 8.49 | 2.71 | Excellent |
| 29 | 10.85 | 3.50 | V. Good |
| 30 | 7.2 | 1.43 | Excellent |
| 31 | 6.3 | 1.22 | Excellent |
| 32 | 9.7 | — | Excellent |

*% Weight change after 10 day immersion @ 90° F.

Since flow time is affected by chain extender concentration, catalyst type and concentration, and isocyanate type, as well as the polyol composition of the present invention, comparisons should be made between examples in which most of those variables are held (roughly) constant.

Average flow times for several examples of the invention and for several additional comparison examples are shown in Table VI. Components are the same as those specified in Table III. The data indicate a significant increase in flow time for the examples of the invention, as the concentration of the PO-tipped polyol is increased, at constant isocyanate, catalyst and chain extender concentrations. Flow times were also observed to generally decrease, as expected with increasing chain extender and catalyst concentrations, at roughly constant polyol composition.

TABLE VI

FLOW TIME COMPARISONS

| Ex # | EO-tipped Polyol Type | EO-tipped Polyol pbw | PO-tipped Polyol Type | PO-tipped Polyol pbw | Chain Extender pbw | Isocyanate Type | Isocyanate pbw | Catalyst T-12 | Catalyst UL-1 | Flow Time Sec. |
|---|---|---|---|---|---|---|---|---|---|---|
| 28* | B | 76.9 | — | 0 | 23 | I | 58.5 | 0.1 | 0 | 3.05 |
| 31* | C | 76.9 | — | 0 | 23 | I | 58.5 | 0.1 | 0 | 2.94 |
| 33 | C | 51.3 | A | 25.6 | 23 | I | 58.5 | 0.1 | 0 | 3.23 |
| 34 | C | 25.6 | A | 51.3 | 23 | I | 58.5 | 0.1 | 0 | 3.90 |
| 29 | C | 25.5 | A | 51.1 | 23 | I | 58.5 | 0.1 | 0.3 | 3.75 |
| 1* | — | 0 | A | 76.6 | 23 | I | 58.5 | 0.1 | 0.3 | 4.05 |
| 35* | — | 0 | A | 76.8 | 23 | I | 58.5 | 0.1 | 0.1 | 4.05 |
| 36* | — | 0 | A | 76.9 | 23 | I | 58.5 | 0.1 | 0 | 4.32 |
| 37 | C | 37.9 | A | 37.9 | 24 | I | 59.5 | .1 | .1 | 3.15 |
| 38 | C | 25.0 | A | 50.6 | 24 | I | 59.5 | .1 | 0 | 3.84 |
| 39* | — | 0 | A | 75.8 | 24 | I | 59.5 | .1 | .1 | 3.90 |
| 32 | C | 47.9 | A | 31.95 | 20 | I | 51.2 | 0.15 | 0 | 3.4 |
| 10* | B | 82.2 | — | 0 | 17.7 | I | 48 | 0.1 | 0 | 3.56 |
| 30* | C | 82.2 | — | 0 | 17.7 | I | 48 | 0.1 | 0 | 3.62 |
| 40 | C | 49.2 | A | 33.0 | 17.7 | I | 48 | 0.1 | 0 | 4.02 |
| 4 | C | 49.1 | A | 32.8 | 18 | I | 48.6 | 0 | .1 | 3.80 |
| 5 | C | 49.0 | A | 32.8 | 18 | I | 48.6 | .1 | .1 | 4.10 |
| 41 | C | 49.1 | A | 32.8 | 18 | I | 48.6 | .05 | .05 | 4.60 |
| 42 | C | 41.3 | A | 41.3 | 17.3 | I | 45.9 | .05 | .05 | 4.73 |
| 43 | C | 41.65 | A | 41.65 | 16.6 | I | 44.5 | .05 | .05 | 4.99 |
| 44 | C | 49.1 | A | 34.8 | 16 | I | 44.0 | .05 | .05 | 6.15 |

*Comparison Examples

Green Strength Rating System

Green Strength was evaluated by removing a test panel from the mold after a mold residence time of 30 sec., and immediately folding the panel tightly over itself.

The folded edge was then examined for crazing or cracking, and rated as follows:

Excellent-absolutely no cracking or crazing
V. Good-v. fine hairline crazing
Good-a few fine surface cracks
Fair-many surface cracks which don't penetrate deeply into material
Poor-cracks which penetrate deeply into the material
V. Poor-cracks which propagate all the way through the panel.

Improved flowability for formulations of the invention was determined by a series of laboratory experiments in which the reaction mixtures were stirred together with a mechanical agitator. The flow time was judged as the length of time from the initiation of stirring until the mixture becomes so viscous that further stirring is hampered. The flow times measured by this method have been observed to be roughly proportional to maximum shot times for a reaction mixture introduced into a mold through a high pressure impingement (RIM) mixhead.

Improved flowability for formulations of the invention was also judged by the ease of obtaining full, low density test panels on a 445×760×3.5 mm plaque tool on an HK-500 RIM machine, without the aid of blowing agents or excessive nitrogen nucleation of the polyol blend. Superior flowability has been confirmed for preferred examples of the invention on actual production machine tools.

Another method of determining the relative flowability of systems is to process the different systems in a large complicated mold and compare the density gradient of the parts produced. In this context, "density gradient" is defined as the difference between maximum and minimum densities of a molded part. The lower the density gradient, the better the flowability characteristics of the system used to produce the molded part. Four formulations (Examples 5, 10, 28 and 29 of Table III) were analyzed for their density gradients. These systems were all run on an HK-1500 RIM machine in a Chevrolet Monza 2+2 front upper fascia tool. The approximate weight of the resulting products was about 3.4 kg (7.5 lb). The following test parameters were used in all cases:

Raw material temperature = 90° F.

-continued

| | |
|---|---|
| Mold temperature | = 140–145° F. |
| Polyol sp. gr. | = 0.73–0.75 |
| Mix pressure | = 2,500 psi |
| Throughput | = 4 lb./sec. |

The results obtained are tabulated in Table VII.

TABLE VII

Density Data from Monza 2 + 2 Front Upper Fascia

| Example No.* | Density of Monza 2 + 2 Fascia (kg/m³) | | Density Gradient kg/m³ (pcf) | Chain Extender conc.(%)** | Polyol Type |
|---|---|---|---|---|---|
| | Maximum | Minimum | | | |
| 5 | 1030 | 999 | 31 (1.9) | 18 | A & C |
| 10 | 1050 | 969 | 81 (5.1) | 17.7 | B only |
| 28 | 1090 | 979 | 111 (6.9) | 23 | B only |
| 29 | 1070 | 990 | 80 (5.0) | 23 | A & C |

*These examples correspond to the identical Example numbers of Table III
**Mixture of about 80 pbw 1-methyl-3,5-diethyl-2,4-phenylene diamine and about 20 pbw 1-methyl-3,5-diethyl-2,6-phenylene diamine Thus, it can be seen that at a constant chain extender concentration, polyol blends containing Polyol A give a lower density gradient (and, therefore, better flowability) than systems using only Polyol B.

What is claimed is:

1. A process for the production of optionally cellular, elastic, shaped articles having an impervious surface layer of polyurethane-polyurea elastomers by reacting a reaction mixture comprising:
    (A) an organic polyisocyanate;
    (B) an ethylene oxide-tipped difunctional or higher functional polyoxyalkylene polyol having a hydroxyl number of from about 22 to about 35 and a total ethylene oxide content of from about 12 to about 22% by weight, based on the total amount of alkylene oxide present in said ethylene oxide-tipped polyol;
    (C) a propylene oxide-tipped difunctional or higher functional polyoxyalkylene polyol containing oxyethylene segments in the internal block of the polyol in a quantity of from 15 to 60% by weight, based on the total amount of alkylene oxide present in said propylene oxide-tipped polyol, and having a hydroxyl number of from about 22 to about 35;
    (D) a catalyst;
    (E) an aromatic amine chain extender, said amine being miscible with components (B) and (C), in any proportion, and optionally;
    (F) blowing agents, surfactants and/or flow enhancing agents;
said reaction mixture being processed as one-shot systems by the reaction injection molding technique (RIM process) and said reactants being used in quantities corresponding to an isocyanate index of from 70 to 130, further characterized in that (i) the polyols (B) and (C) are used in a weight ratio less than or equal to 5:1, and (ii) the composition and proportions of (B) and (C) are selected such that the total concentration of oxyethylene groups in the final polyurethane is from about 7 to about 14% by weight.

2. A process as claimed in claim 1 wherein component (A) is a liquefied derivative of 4,4'-diisocyanatodiphenylmethane at room temperature; component (D) is dibutyl tin dilaurate or dibutyl tin dilauryl mercaptide or a mixture thereof, optionally with 2,3-dimethyl tetrahydropyrimidine or triethylene diamine or mixtures thereof; and component (E) is 1-methyl-3,5-diethyl-2,4-diaminobenzene or 1-methyl-3,5-diethyl-2,6-diaminobenzene or 1,3,5-triethyl-2,6-diaminobenzene or 3,5,3',5'-tetraethyl-4,4'-diaminodiphenylmethane or 3,5,3',5'-tetraisopropyl-4,4'-diaminodiphenylmethane or mixtures thereof.

3. A process as claimed in claim 1 wherein component (B) is an EO-tipped glycerine initiated poly(oxyalkylene) polyether of OH number 28, containing 87% propylene oxide and 13% ethylene oxide tip.

4. A process as claimed in claim 1 wherein component (C) is a PO-tipped propylene glycol initiated poly(oxyalkylene) polyether of OH number 28, containing a mixed block of 50% ethylene oxide and 40% propylene oxide with a 10% propylene oxide tip.

5. A process as claimed in claim 1 wherein component (C) is a PO-tipped glycerine initiated poly(oxyalkylene) polyether of OH number 26, containing a mixed block of 60% ethylene oxide and 30% propylene oxide with a 10% propylene oxide tip.

6. A process as claimed in claim 1 wherein component (C) is a PO-tipped glycerine initiated poly(oxyalkylene) polyether of OH number 25, containing a mixed block of 17% ethylene oxide and 58% propylene oxide with a 25% propylene oxide tip.

7. A process as claimed in claim 1 wherein component (D) is used in an amount of from 0.001 to 10% by weight, based on quantity of compounds (B), (C), (D), (E) and (F).

8. A process as claimed in claim 1 wherein component (E) is used in an amount of from 5 to 50% by weight based on the quantity of compounds (B), (C), (D), (E) and (F).

9. A process as claimed in claim 1 wherein the starting temperature of the reaction mixture introduced into the molds is from 10° to 60° C. and further characterized in that the mold temperature is from 40° to 100° C., preferably from 50° to 70° C.

10. A process as claimed in claim 1 wherein the amount of reaction mixture introduced into the mold produces a molding having a density of from 0.8 to 1.2 g/cc.

11. A process as claimed in claim 1 wherein the weight ratio of component (B) to component (C) is from 4:1 to 1:4.

12. A process as claimed in claim 1 wherein component (C) is a PO-tipped glycerine initiated poly(oxyalkylene) polyether of OH number 25, containing a mixed block of 27% ethylene oxide and 48% propylene oxide with a 25% propylene oxide tip.

* * * * *